United States Patent Office 3,304,822
Patented Feb. 21, 1967

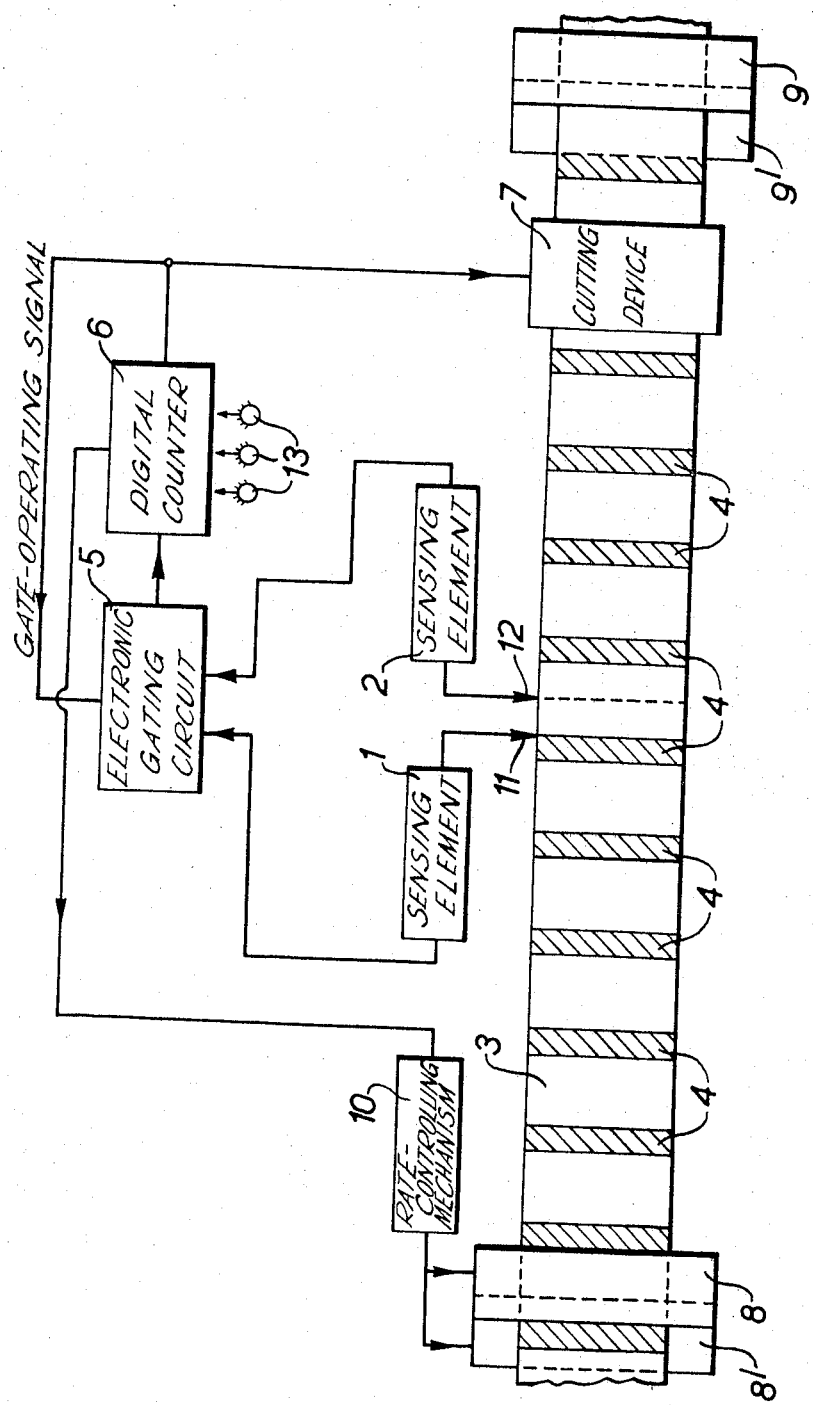

3,304,822
APPARATUS AND METHOD WHICH MAY BE USED IN THE MANUFACTURE OF HONEYCOMB STRUCTURES
James Keith Barnes, Fowlmere, and Roger William Upton, Rugeley, England, assignors to Ciba Limited, Basel, Switzerland, a corporation of Switzerland
Filed Jan. 11, 1965, Ser. No. 424,714
Claims priority, application Great Britain, Jan. 17, 1964, 2,270/64
7 Claims. (Cl. 83—29)

This invention relates to an apparatus and a method for handling sheet material which may be used in making honeycomb structures.

Honeycomb structures may be produced by applying to a sheet of metallic foil, paper, cellulose ester or other plastic material, continuous or discontinuous lines of adhesives, and superimposing a number of such sheets with the lines of adhesive alternately staggered causing the superimposed sheets of the stack to adhere together at the said lines of adhesive, cutting the pile of sheets so produced transversely to (i.e. substantially at right angles to) the said lines of adhesive into piles having a width equal to the thickness desired for the honeycomb structure and opening out the non-adhering walls to form a honeycomb of which the axes of the individual cells extend transversely to the structural element.

Honeycomb structures may also be produced by applying parallel lines of adhesive to one side of a continuous web of sheet material, the said lines running transversely across the web, cutting the printed web transversely into sheets of equal length, and superimposing the cut sheets to form a stack in which all the lines of adhesive are parallel, the cut length being selected so that the said lines of adhesive in the stack are in staggered relationship, causing the superimposed sheets of the stack to adhere together at the said lines of adhesive, cutting a slice through the stack at an angle (usually, but not necessarily, at a right angle) to the said lines of adhesive, and opening out the cut slice to form a honeycomb structure.

Usually it is convenient to apply the adhesive in equally spaced lines along one face of the continuous web, and then to shear the continuous web along a line parallel to the lines of adhesive. Further sheets are cut from the continuous web along a similar line, such that the position of the lines of incision in any sheet differs from that in the immediately preceding sheet by a pitch equal to half the distance between adjacent lines of adhesive. The cut sheets are stacked alternately, the faces bearing the lines of adhesive contacting the reverse faces which do not bear lines of adhesive. The sides of the sheets along one vertical side of the stack are brought into register when the lines of adhesive in consecutive sheets are in staggered relationship with each other. To increase the speed and accuracy of cutting of such sheets it is desirable to provide some means whereby the sheets may be cut automatically from a continuously moving web.

According to one feature of the present invention there is provided an apparatus for handling sheet material, upon one surface and across the width of which material spaced areas of adhesive have been applied, which includes means for feeding the material through the apparatus, two signal generating sensing elements having their sensing points spaced apart a predetermined distance and arranged to detect the presence of the adhesive, counting means, gating means connected between the outputs from the sensing elements and the input to the counting means to allow signals from only one element to reach the counting means, at any one time, a cutting device arranged to cut the material into lengths after the material has passed the sensing points, a connection between an output from the counting means and the cutting device whereby the cutting device is operated when the counting means has counted a given number of areas of adhesive as a result of signals from the one of the sensing elements, and a connection from the output from the counting means to the gating means whereby when the given number of areas of adhesive has been counted the gating circuit is operated to cause signals from the other of the sensing elements to be connected to the counting means, whereby when the counter has counted the same given number of signals from the other of the sensing elements the cutting device is operated. It will be understood that the position of the lines of adhesive relative to the cut ends of the sheets is such that on aligning the ends of the sheets the adhesive lines necessarily take up the desired staggered relationship, since the sensing elements are separated by half the distance between adjacent lines of adhesive.

According to a further feature of the present invention there is provided a method of handling sheet material, upon one surface and across the width of which material spaced areas of adhesive have been applied, which includes the steps of feeding the material past two signal generating sensing elements having their sensing points spaced apart a predetermined distance, transmitting a train of signals from one of the elements via a gating circuit to a counter, each of the said signals being representative of an area of adhesive that passes the said one of the elements, counting by means of the counter the number of signals transmitted by the one of the elements causing both a cutting device to shear a length off the sheet when a given number of signals has been counted and the gating circuit to operate and to allow a train of signals each representative of an area of adhesive to be transmitted from the other of the elements to the counter, counting number of the signals, and, when the given number has been counted, causing the cutting device to shear a further length off the sheet and restoring the condition of the gating circuit.

An embodiment of the invention will now be described with reference to the accompanying drawing which shows a schematic plan view of a web cutting and handling arrangement together with a circuit configuration.

Material in the form of a continuous web 3 is fed by means of a pair of cooperating driving or nip rollers 8, 8' under two sensing elements 1, 2 having their sensing points at 11, 12. The sensing elements may be for example photoelectric cells or devices for measuring directly the resistivity of the continuous web to which lines of adhesive 4 forming spaced areas have been applied. The sensing points are spaced apart by a distance equal to one half the distance between adjacent lines of adhesive. The resultant trains of signals from the sensing elements are alternately selected by a conventional electronic gating circuit 5 which may make use of semiconductor or thermionic valve binary logic circuits. The signals are amplified, filtered and shaped to improve their signal to noise ratio prior to reaching the electronic gate by means of conventional semiconductor and/or thermionic amplifiers, and are fed via the electronic gate to an electronic digital counter 6 which may include for example thermionic valve-driven ten-state glow transfer type elements, thermionic valve-driven two-state neon type elements, semiconductor-driven equivalents of these; or complete transistorised counters arranged for counting in binary, binary decimal, or ring of ten modes.

After a number of signals, corresponding to a desired length of sheet material and predetermined by the setting of a length setting switch 13, has been received by the counter 6, the output of the counter initiates the operation of a shear or vertically operated guillotine 7, by means of solenoids, or hydraulic or pneumatic means, either via a relay or by direct switching methods using semiconductors, thermionic hard valves, or thermionic vapour- or gas-filled valves. At the same time a signal is sent to the gating circuit 5 so as to switch the counter from receiving signals from one sensing element to receive signals from the other.

After the same number of signals from the other sensing element has been received by the counter 6, the operation of the shear or vertically operated guillotine 7 is initiated in a like manner, a signal is sent to the gating circuit 5 to switch the counter back to receive signals from the first sensing element, and the sequence of operations is repeated.

The cut sheets are carried from the cutting device 7, by means of a pair of co-operating driving or nip rollers 9, 9' and, or alternatively, a conveyor belt, and are stacked. The edges of the cut sheets may be aligned manually, or mechanically by conventional means such as a joggle box.

The output of the counting system may be modified so that at a desired interval before the required length of continuous web material has passed the cutting device, the rate of passage of the continuous web material is reduced until the shearing operation has been completed. By this means greater accuracy in cutting the continuous web is achieved.

According, therefore, to a preferred embodiment of the invention, the counting device is further adapted, so as, on receipt of a predetermined, lesser number of signals, to actuate a device to slow the rate of passage of the continuous web towards the sensing elements until the predetermined, greater number of signals has been received from one or other of the sensing elements and the cutting of the continuous web has been effected by the cutting device.

Thus, in one form of apparatus according to the invention, a signal from the counting device 6, initiated after receipt of the predetermined lesser number of signals corresponding to a length of sheet material less than the length of each cut sheet and determined by the setting of a length setting switch 13, switches in an electrical resistance 10 to reduce the power supplied to an electric motor (not shown) which drives the pair of rollers 8, 8', thus reducing the rate of passage of the continuous web to the sensing elements. On receipt of the predetermined, greater number of signals corresponding to the desired length of the cut sheet, a further signal from the counting device 6 switches out the electrical resistance after effecting the cutting of the continuous web, thus restoring the rate of motion of the continuous sheet towards the sensing elements to that before retardation.

The delay between reception of a predetermined number of signals by the counter and cutting of the continuous web, and the rate of passage of the continuous web, are the same in each successive operation. It is therefore immaterial whether the cut in the continuous web be made along a line of adhesive or between adjacent lines of adhesive; since with the aforementioned linear spacing of the two sensing elements the lines of adhesive in adjacent stacked and aligned sheets are necessarily in the desired staggered relationship.

In an apparatus made in accordance with the invention a continuous web of sheet material may be passed under the cutting device at an average rate of 12.2 metres per minute, the lines of adhesive being 5.1 mm. apart, and the position of the shear relative to the transverse adhesive lines may be controlled to within 0.1 mm.

The invention includes within its scope the process for cutting a continuous sheet of web material carrying spaced parallel lines of adhesive into sheets utilizing the above-defined apparatus.

The invention further includes within its scope a process for the production of a honeycomb material which comprises superimposing the cut sheets so obtained to form a stack in which all the lines of adhesive are parallel, causing the superimposed sheets of the stack to adhere together along the said lines of adhesive, cutting a slice through the stack at an angle to the said lines of adhesive and, if desired, opening out the cut slice.

We claim:

1. An apparatus for handling sheet material, upon one surface and across the width of which material spaced areas of adhesive have been applied, which includes means for feeding the material through the apparatus, two signal generating sensing elements having their sensing points spaced apart a predetermined distance and arranged to detect the presence of the adhesive, counting means, gating means connected between the outputs from the sensing elements and the input to the counting means to allow signals from only one element to reach the counting means at any one time, a cutting device arranged to cut the material into lengths after the material has passed the sensing points, a connection between an output from the counting means and the cutting device whereby the cutting device is operated when the counting means has counted a given number of areas of adhesive as a result of signals from the one of the sensing elements, and a connection from the output from the counting means to the gating means whereby when the given number of areas of adhesive has been counted the gating circuit is operated to cause signals from the other of the sensing elements to be connected to the counting means, whereby when the counter has counted the same given number of signals from the other of the sensing elements the cutting device is operated.

2. An apparatus as claimed in claim 1 including a connection between the means for feeding the material and an output from the counting means and means to cause the counter to transmit a signal by the last mentioned connection to slow the rate of feeding of the material after the counter has counted a number of areas less than the given number, and to cause the rate of feeding to be restored after the given number of areas has been counted.

3. An apparatus as claimed in claim 1 wherein the sensing points are in a line parallel to the direction of feeding of the material.

4. An apparatus as claimed in claim 1 in which the sensing points are spaced apart by a distance equal to one half the distance between adjacent areas of adhesive.

5. An apparatus as claimed in claim 1 in which the areas are in parallel lines.

6. A method of handling sheet material, upon one surface and across the width of which material spaced areas of adhesive have been applied, which includes the steps of feeding the material past two signal generating sensing elements having their sensing point spaced apart a predetermined distance, transmitting a train of signals from one of the elements via a gating circuit to a counter, each of the said signals being representative of an area of adhesive that passes the said one of the elements, counting by means of the counter the number of signals transmitted by the one of the elements causing both a cutting device to shear a length off the sheet when a given number of signals has been counted and the gating circuit to operate and to allow a train of signals each representative of an area of adhesive to be transmitted from the other of the elements to the counter, counting number of the signals, and, when the given number has been counted, causing the cutting device to shear a further length off the sheet and restoring the condition of the gating circuit.

7. A method as claimed in claim 6 in which the areas are parallel lines and the sheared lengths are superimposed to form a stack with the lines of adhesive in parallel and between each sheet, causing the superimposed sheets to adhere along the lines of adhesive, cutting a slice through the stack at an angle to the lines of adhesive, and opening out the cut slice to form a honeycomb structure.

No references cited.

WILLIAM W. DYER, JR., *Primary Examiner.*